(12) United States Patent
Kilian

(10) Patent No.: US 7,374,227 B1
(45) Date of Patent: May 20, 2008

(54) BODY SIDE WEATHER-STRIP FLANGE FOR ELIMINATING RED RUST CORROSION

(75) Inventor: Erik Kilian, Northville, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 27 days.

(21) Appl. No.: 11/566,711

(22) Filed: Dec. 5, 2006

(51) Int. Cl.
*B60J 10/08* (2006.01)
(52) U.S. Cl. .................... 296/146.9; 49/498.1
(58) Field of Classification Search ............ 296/146.9; 49/498.1, 492.1, 493.1
See application file for complete search history.

(56) References Cited

U.S. PATENT DOCUMENTS

| | | |
|---|---|---|
| 1,477,752 A | 12/1923 | Galamb |
| 3,635,519 A | 1/1972 | Foster et al. |
| 4,433,867 A | 2/1984 | Perry et al. |
| 4,508,382 A | 4/1985 | Tsumoto et al. |
| 6,226,953 B1 | 5/2001 | Uno et al. |
| 7,083,222 B2 | 8/2006 | Oda et al. |
| 7,115,322 B2 | 10/2006 | Curtiss et al. |

FOREIGN PATENT DOCUMENTS

JP 2002316596 10/2002

*Primary Examiner*—Joseph D Pape
(74) *Attorney, Agent, or Firm*—Gigette Bejin, Esq.; Dykema Gossett PLLC

(57) ABSTRACT

A vehicle weather strip flange configured to eliminate corrosion for a predetermined time period. The flange may include at least one indented area disposable against a vehicle body and an opening for insertion of a fastener for attaching the flange to the vehicle body. The indented area may include a predetermined depth for maintaining an un-indented area of the flange at a predetermined distance from the vehicle body. The un-indented area of the flange may include exposed inner areas facing toward the vehicle body and exposed outer areas facing away from the vehicle body. The predetermined distance may permit the exposed inner and outer areas to be coated by a corrosion protection liquid for thereby eliminating corrosion from the un-indented area for the predetermined time period.

18 Claims, 6 Drawing Sheets

BODY SIDE WEATHER-STRIP FLANGE FOR ELIMINATING RED RUST CORROSION

BACKGROUND OF INVENTION a. Field of Invention

The invention relates generally to vehicle structural design for providing corrosion resistance, and more particularly, to a vehicle body side weather strip flange for providing corrosion resistance.

b. Description of Related Art

As is known in the art, a variety of materials and techniques are used for minimizing or eliminating corrosion in vehicles. To be acceptable, such techniques must generally protect a vehicle for at least 10 years of service. In modern vehicles, exemplary corrosion protection techniques include the use of materials such as aluminum or composites in areas susceptible to water contact. If such materials cannot be used due to cost or performance constraints, the vehicle steel body may be coated with phosphate and e-coat. However, for such a coating to be effective, the phosphate and e-coat must properly penetrate and coat all areas that may be exposed to water during vehicle use. Such penetration and coating can be extremely difficult to achieve in vehicles that include numerous areas that can be susceptible to water contact, and further, the design of many vehicle features based on performance, safety and ergonomics can further make the requirement of such features to be corrosion resistant a difficult task.

Corrosion resistance is often of primary concern in areas that are directly exposed to the elements and are further visible during ordinary use. One such area includes the area between the vehicle driver/passenger entrance and exit, and the sealing perimeter of the vehicle doors. As shown in FIGS. 1-4, the area 10 between a vehicle driver/passenger entrance and exit 12 and sealing perimeter 14 of vehicle door 16 generally includes a weather strip 18 attached to perimeter 14. Perimeter 14 generally includes a flange 20 onto which weather strip 18 is attached by means of adhesive or other known methods.

During normal use, water and other contaminants can become trapped in the area of the weather strip, and especially in any gaps present between the weather strip and the flange, and the flange and the vehicle body, and result in build-up of red rust 22 (see FIGS. 1-4). Current solutions for eliminating rust in vehicles in the gaps between the flange and the vehicle body are relatively expensive. One such solution includes spraying phosphate and e-coat in the areas of the gaps between the flanges and the vehicle body. Referring to FIG. 5, another such solution includes the installation of sealer beads 24 onto flange 20 for prevention of water intrusion into the weather strip flange area. As is known in the industry, this latter solution is relatively expensive due to the requirement of additional heads for installation of sealer beads, from a design, manufacturing and maintenance viewpoint.

Other structures and techniques have been proposed for mounting weather strips and for sealing automobile structures from water and other contaminants. For example, referring to FIGS. 1-4 of U.S. Pat. No. 7,083,222 to Oda, there is disclosed a structure for mounting weather strip (2) to door panel (1A) or body panel (1B) of an automobile, including holes (1b) and engagement member (8) for retention of weather strip (2). Although Oda discloses a structure for mounting weather stripping, the Oda structure however does not address potential corrosion due to water penetration between the structure itself and the vehicle body.

It is therefore desirable to provide an automobile structure and weather strip flange design which is simple and economical to implement, and which provides corrosion resistance for at least up to ten years of normal vehicle use. It is also desirable to provide an automobile structure and weather strip flange design which may be implemented without requiring significant modification of existing automobile design and assembly procedures.

SUMMARY OF THE INVENTION

The invention solves the problems and overcomes the drawbacks and deficiencies of prior art automobile corrosion prevention techniques by providing a vehicle weather strip flange configured to eliminate corrosion for a predetermined time period. The flange may include at least one indented area (i.e. a standoff) disposable against a vehicle body and an opening for insertion of a fastener for attaching the flange to the vehicle body. The indented area may include a predetermined depth for maintaining an un-indented area of the flange at a predetermined distance from the vehicle body. The un-indented area of the flange may include exposed inner areas facing toward the vehicle body and exposed outer areas facing away from the vehicle body. The predetermined distance may permit the exposed inner and outer areas to be coated by a corrosion protection liquid for thereby eliminating corrosion from the un-indented area for the predetermined time period.

For the weather strip flange described above, in an exemplary embodiment, the indented area may be generally rectangular. The corrosion protection liquid may be phosphate and e-coat. Based on the aforementioned design, the flange may thus include virtually no rust for corrosion testing for 10 years on its exposed inner and outer areas. Further, in a particular embodiment, the opening may be elongated for permitting adjustment of the flange during attachment to the vehicle body.

The invention also provides a vehicle including a weather strip flange configured to eliminate corrosion for a predetermined time period. The flange may include at least one indented area disposable against a vehicle body and an opening for insertion of a fastener for attaching the flange to the vehicle body. The indented area may include a predetermined depth for maintaining an un-indented area of the flange at a predetermined distance from the vehicle body. The un-indented area of the flange may include exposed inner areas facing toward the vehicle body and exposed outer areas facing away from the vehicle body. The predetermined distance may permit the exposed inner and outer areas to be coated by a corrosion protection liquid for thereby eliminating corrosion from the un-indented area for the predetermined time period.

Yet further, the invention provides a vehicle weather strip flange configured to minimize corrosion for a predetermined time period. The flange may include at least one indented area disposable against a vehicle body. The indented area may include a predetermined depth for maintaining an un-indented area of the flange at a predetermined distance from the vehicle body. The un-indented area of the flange may include exposed inner areas facing toward the vehicle body and exposed outer areas facing away from the vehicle body. The predetermined distance may permit the exposed inner and outer areas to be coated by a corrosion protection liquid for thereby minimizing corrosion from the un-indented area for the predetermined time period.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION OF THE PREFERRED EMBODIMENTS

Figure 1:
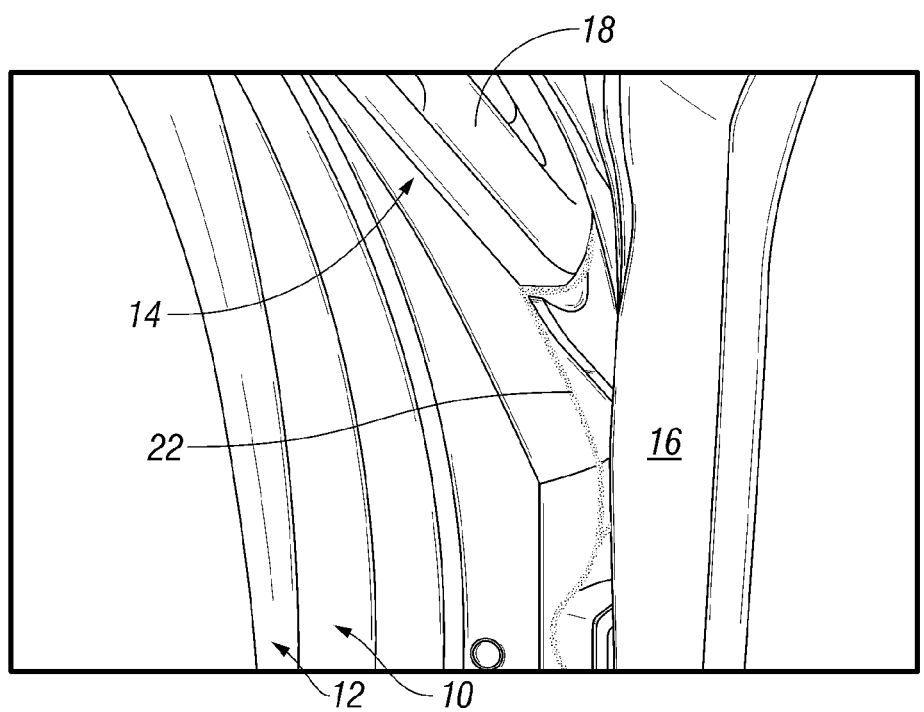
FIG. 1 is an exemplary view of a related art vehicle weather strip flange design, illustrating corrosion in the flange area after approximately two years of normal use.
Figure 2:
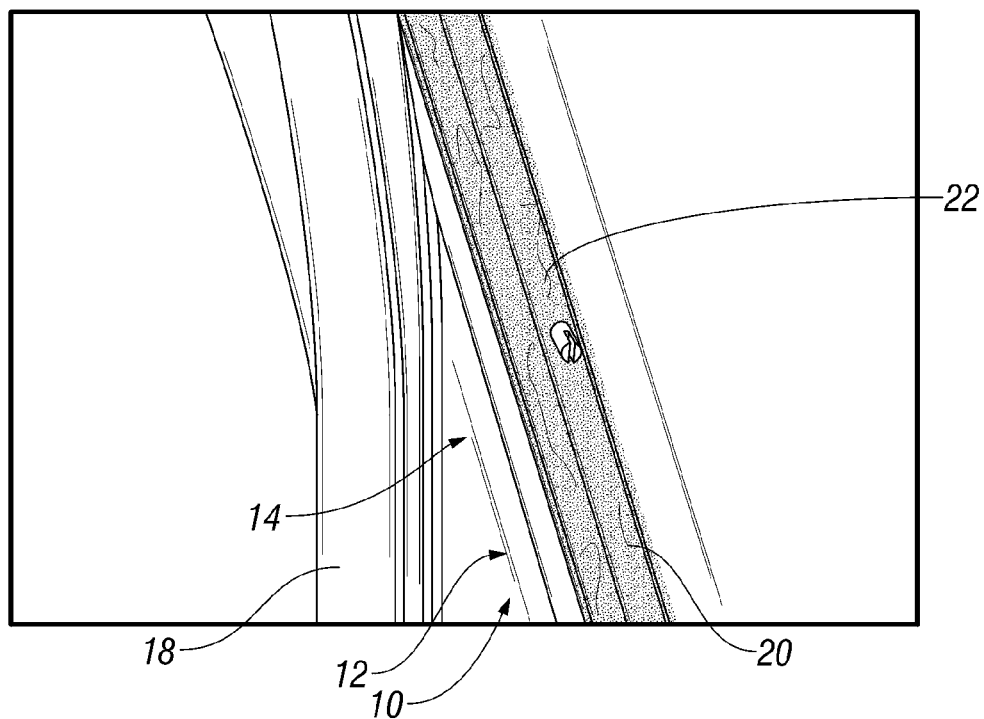
FIG. 2 is an exemplary view of the related art vehicle weather strip flange design of FIG. 1, illustrating corrosion in the flange area after approximately six years of normal use.
Figure 3:
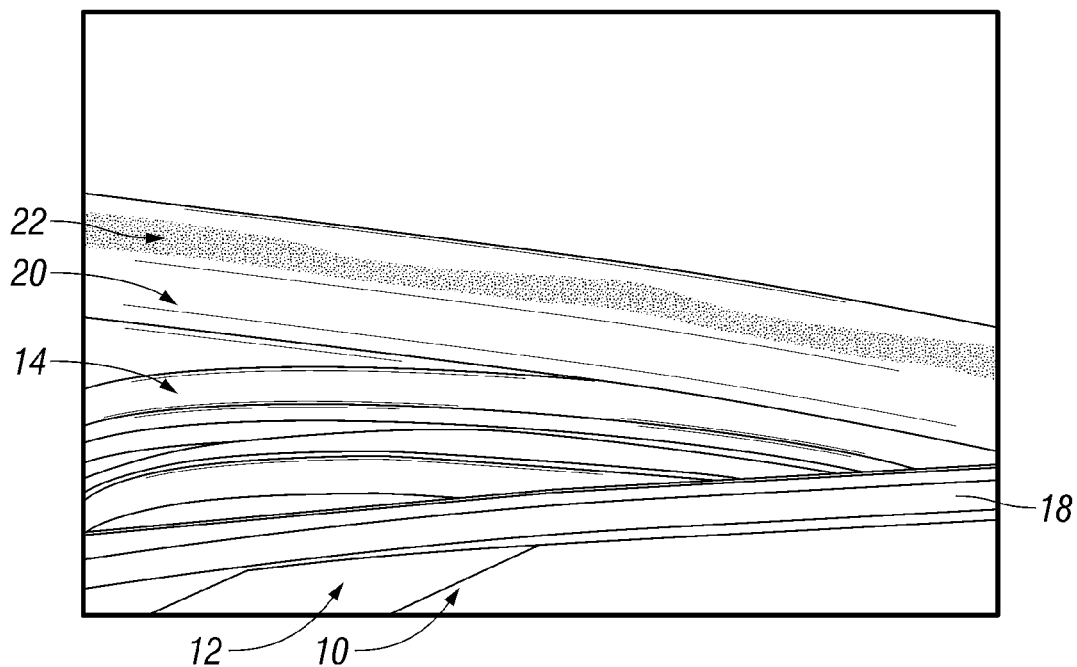
FIG. 3 is an exemplary view of another related art vehicle weather strip flange design, illustrating corrosion in the flange area after approximately eight years of normal use.
Figure 4:
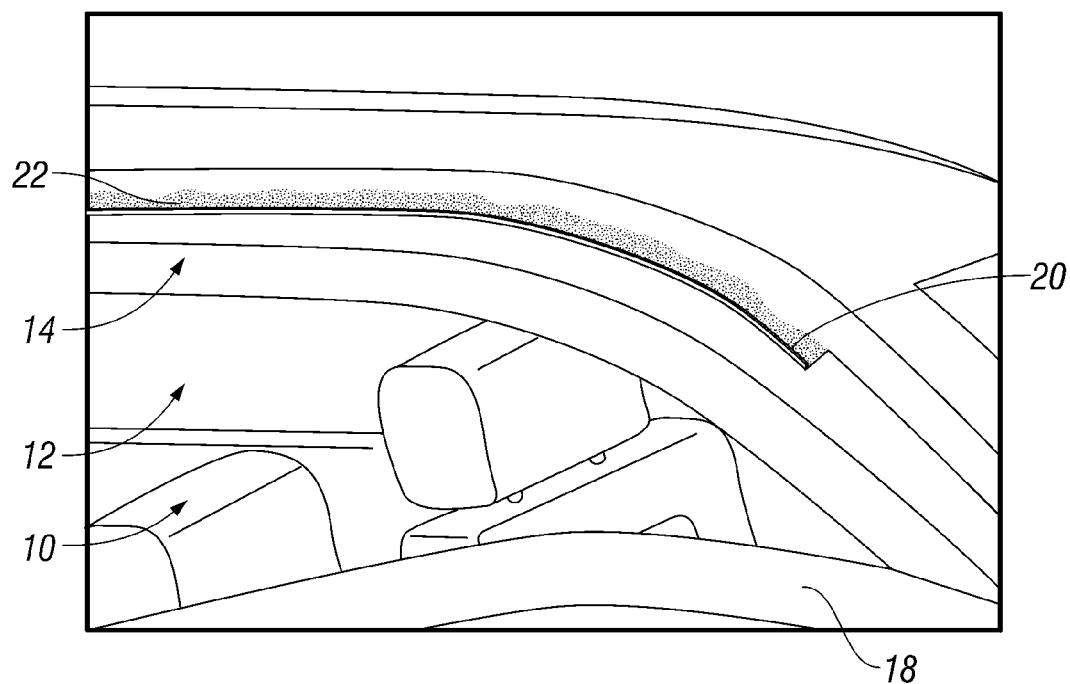
FIG. 4 is another exemplary view of the related art vehicle weather strip flange design of FIG. 3, illustrating corrosion in the flange area after approximately eight years of normal use.
Figure 5:
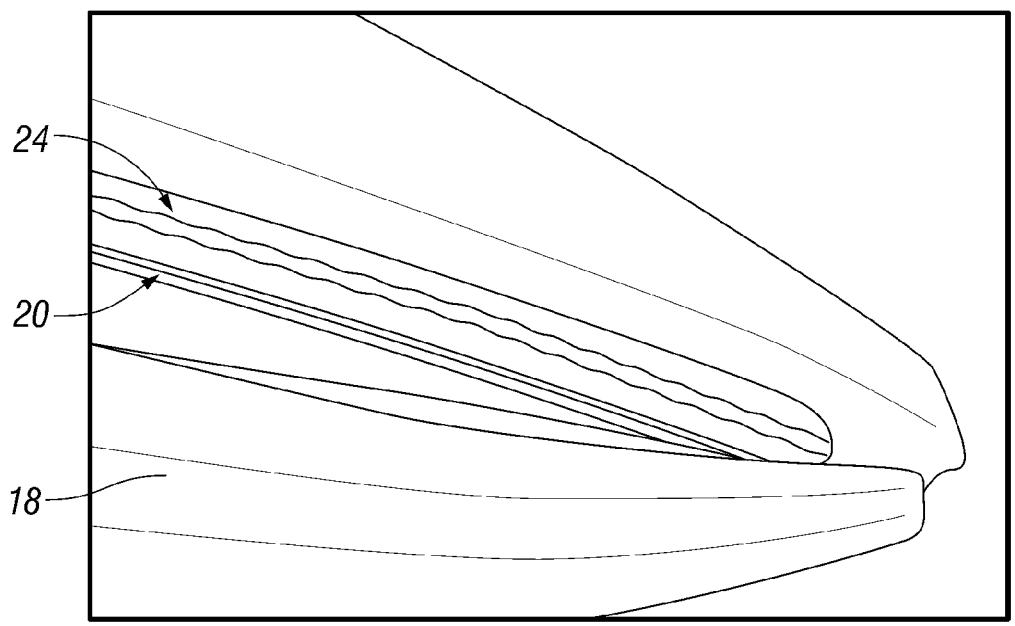
FIG. 5 is an exemplary view of another related art vehicle weather strip flange design, illustrating use of a sealer bead on the retainer flange for corrosion prevention.

Referring now to the drawings wherein like reference numerals designate corresponding parts throughout the several views, FIGS. 6-11 illustrate various views of a vehicle weather strip flange design (hereinafter "weather strip flange") according to the present invention.

Referring to FIGS. 6-11, the present invention generally provides a vehicle structure 30 including a driver/passenger ingress/egress area 32 which may be closed by a door (not shown). Structure 30 may include a weather strip flange 34 onto which a weather strip 35 may be slidably mounted or mounted by means of adhesive. Weather strip flange 34 may be provided adjacent roof 36 of structure 30, and include a plurality of integrated standoffs 38 disposed at predetermined locations relative to structure 30. As shown in FIGS. 6, 7, 10 and 11, in the particular embodiment illustrated, standoffs 38 may include a generally rectangular area 40 including elongated openings 42 for insertion of retention fastener 44 (i.e. a rivet). Rectangular area 40 may be indented to allow for contiguous engagement with structure 30 to thus eliminate any gap between area 40 and structure 30. Rectangular area 40 may also allow for a predetermined gap 46 between flange 34 and structure 30 to allow adequate penetration and curing of phosphate and e-coat for corrosion protection.

Figure 6:
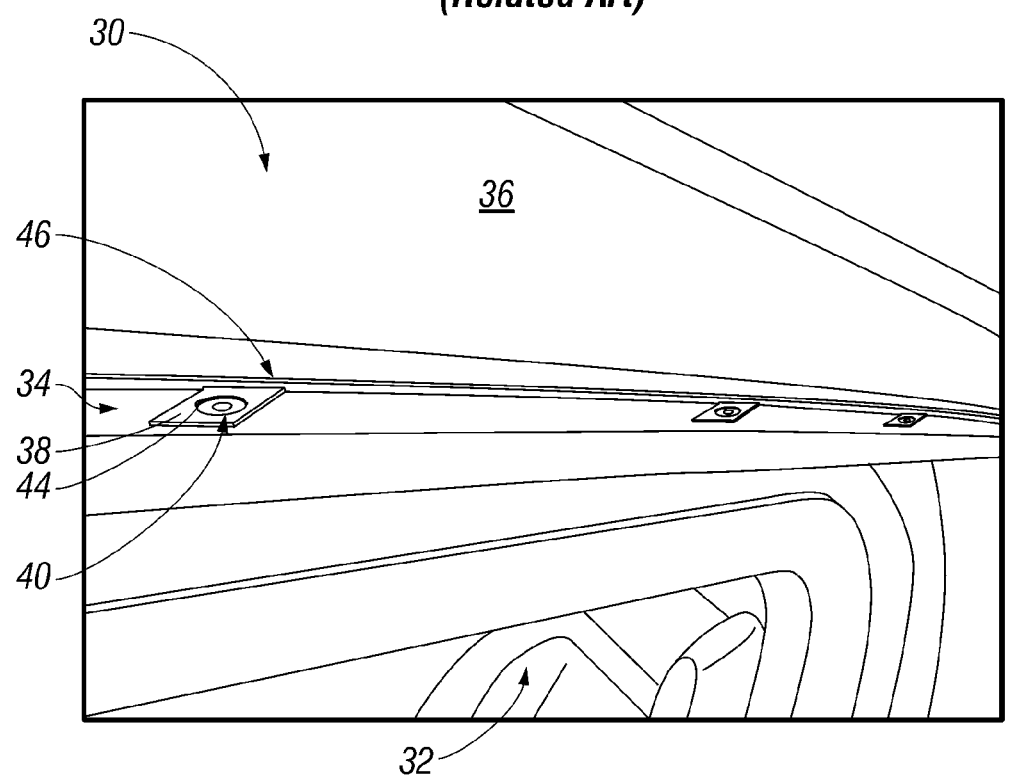
FIG. 6 is an exemplary view of a vehicle weather strip flange design according to the present invention, without a weather strip installed onto the flange.
Figure 7:
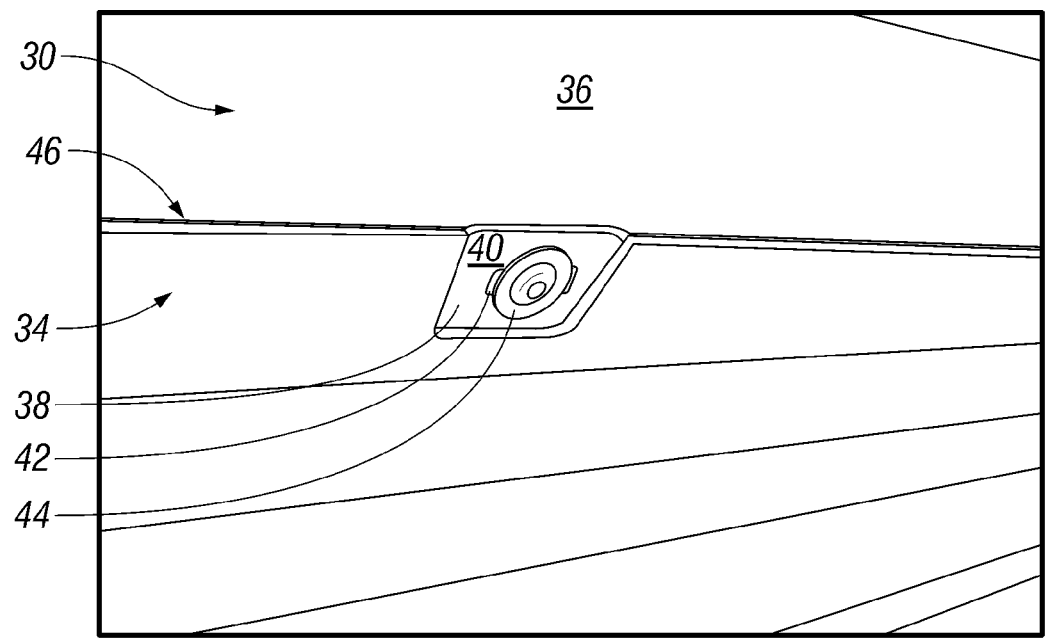
FIG. 7 is an exemplary view of the vehicle weather strip flange design of FIG. 6, without a weather strip installed onto the flange.
Figure 8:
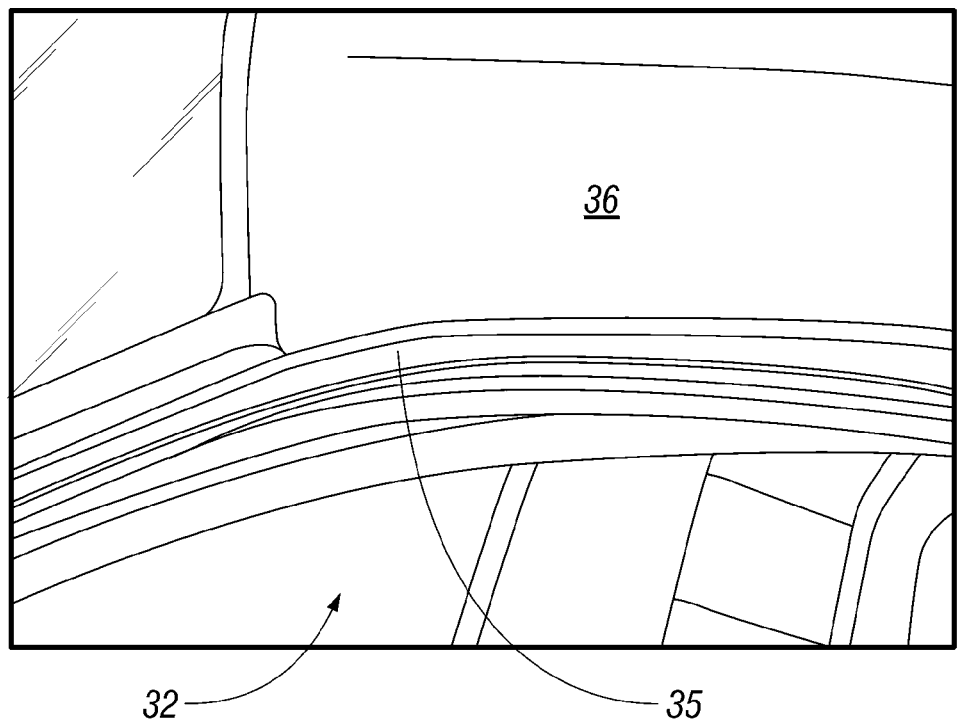
FIG. 8 is an exemplary view of the vehicle weather strip flange design of FIG. 6, with a weather strip installed onto the flange.
Figure 9:
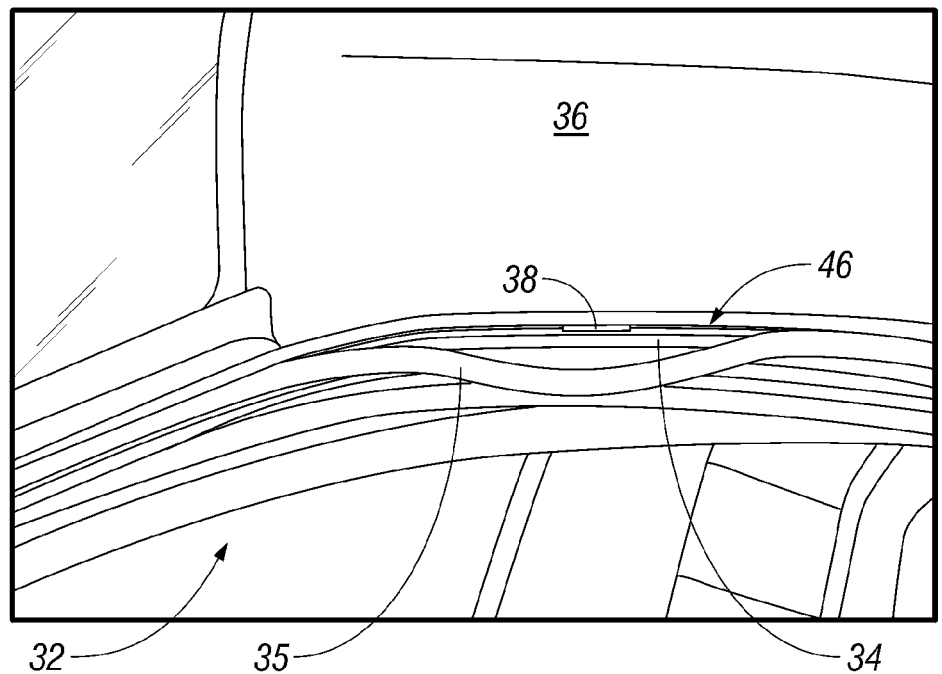
FIG. 9 is an exemplary view of the vehicle weather strip flange design of FIG. 6, with a weather strip partially pulled back from the flange.
Figure 10:
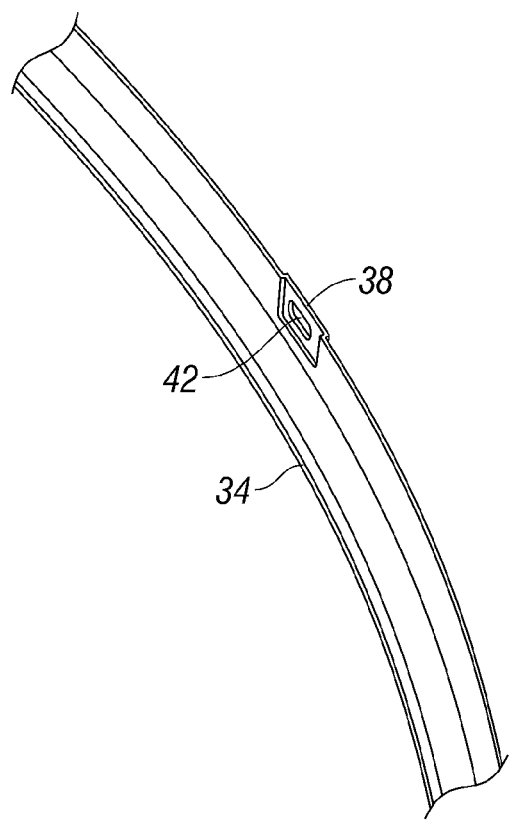
FIG. 10 is a perspective view of the vehicle weather strip flange design of FIG. 6, illustrating an integrated standoff provided on the weather strip.
Figure 11:
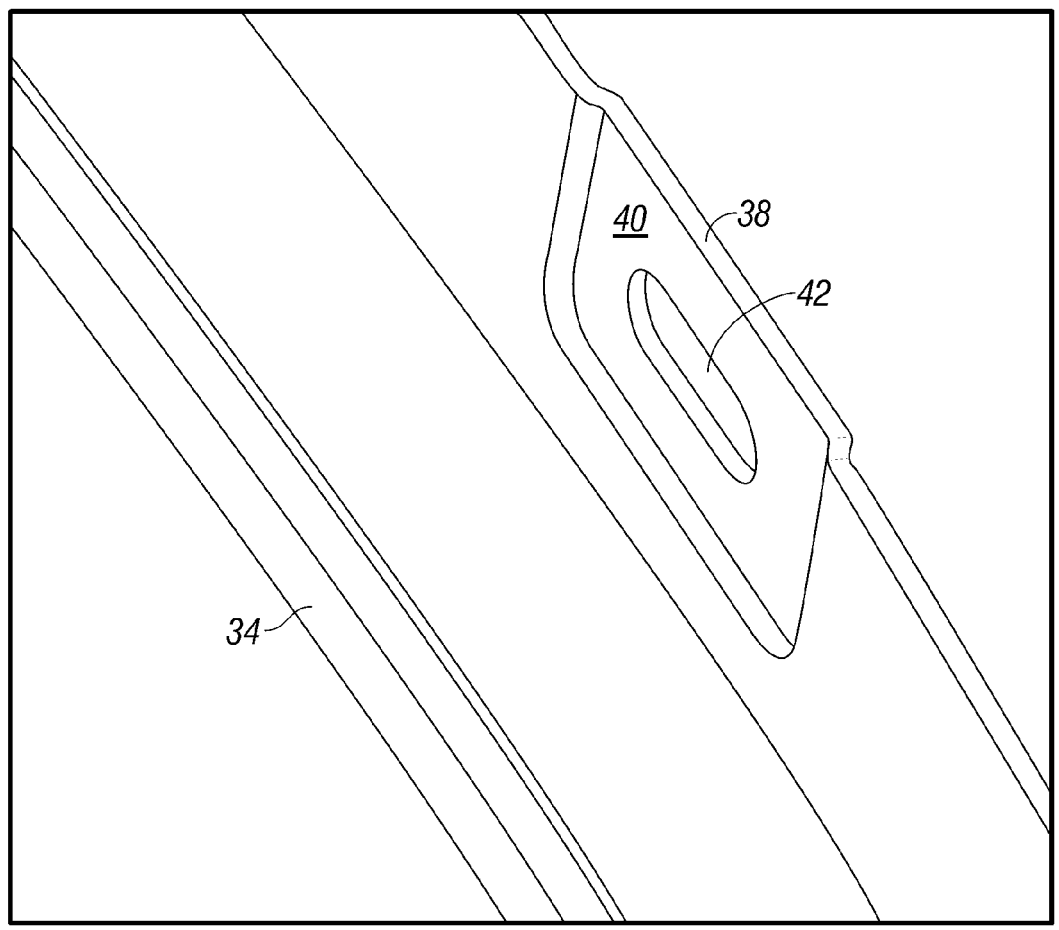
FIG. 11 is an enlarged perspective view of the vehicle weather strip flange design of FIG. 6, illustrating the integrated standoff provided on the weather strip.

As shown in results of FIGS. 6 and 7, in experimentation performed herein, vehicle structure 30 including weather strip flanges 34 was tested for APG Corrosion Testing of 100 cycles (i.e. 10 years) and showed no rust on flanges 34 or at the areas between flanges 34 and vehicle structure 30. Thus due to the elimination of rust between gap 46 between flange 34 and structure 30, no rust was likewise present between standoffs 38 and structure 30.

Those skilled in the art would readily appreciate in view of this disclosure that various modifications could be made to weather strip flange 34 described above, without departing from the scope of the present invention. For example, instead of flange 34 including rectangular areas 40, areas 40 may be formed of a variety of other indented shapes so long as areas 40 allow flange 34 to be disposed away from structure 30 with a predetermined gap 46 between flange 34 and structure 30. It should be apparent to those skilled in the art in view of this disclosure that the corrosion prevention system discussed above may also be applicable to other vehicle areas, such as the trunk, sun/moon roof and other areas including weather strips.

The present invention thus provides an automobile structure and weather strip flange design which is simple and economical to implement, and which provides corrosion resistance for at least up to ten years of normal vehicle use. The invention also provides an automobile structure and weather strip flange design which may be implemented without requiring significant modification of existing automobile design and assembly procedures.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A vehicle weather strip flange configured to eliminate corrosion for a predetermined time period, said flange comprising:
    at least one indented area disposable against a vehicle body and an opening for insertion of a fastener for attaching said flange to the vehicle body, said indented area including a predetermined depth for maintaining an un-indented area of said flange at a predetermined distance from the vehicle body, said un-indented area of said flange including exposed inner areas facing toward the vehicle body and exposed outer areas facing away from the vehicle body,
    wherein said predetermined distance permits said exposed inner and outer areas to be coated by a corrosion protection liquid for thereby eliminating corrosion from said un-indented area for the predetermined time period.

2. A weather strip flange according to claim 1, wherein said indented area is generally rectangular.

3. A weather strip flange according to claim 1, wherein said corrosion protection liquid is phosphate and e-coat.

4. A weather strip flange according to claim 1, wherein said flange includes virtually no rust for corrosion testing for 10 years.

5. A weather strip flange according to claim 1, wherein said flange includes virtually no rust on said exposed inner and outer areas for corrosion testing for 10 years.

6. A weather strip flange according to claim 1, wherein said opening is elongated for permitting adjustment of the flange during attachment to the vehicle body.

7. A vehicle including a weather strip flange configured to eliminate corrosion for a predetermined time period, said flange comprising:
   at least one indented area disposable against a vehicle body and an opening for insertion of a fastener for attaching said flange to the vehicle body, said indented area including a predetermined depth for maintaining an un-indented area of said flange at a predetermined distance from the vehicle body, said un-indented area of said flange including exposed inner areas facing toward the vehicle body and exposed outer areas facing away from the vehicle body,
   wherein said predetermined distance permits said exposed inner and outer areas to be coated by a corrosion protection liquid for thereby eliminating corrosion from said un-indented area for the predetermined time period.

8. A vehicle according to claim 7, wherein said indented area is generally rectangular.

9. A vehicle according to claim 7, wherein said corrosion protection liquid is phosphate and e-coat.

10. A vehicle according to claim 7, wherein said flange includes virtually no rust for corrosion testing for 10 years.

11. A vehicle according to claim 7, wherein said flange includes virtually no rust on said exposed inner and outer areas for corrosion testing for 10 years.

12. A vehicle according to claim 7, wherein said opening is elongated for permitting adjustment of the flange during attachment to the vehicle body.

13. A vehicle weather strip flange configured to minimize corrosion for a predetermined time period, said flange comprising:
   at least one indented area disposable against a vehicle body, said indented area including a predetermined depth for maintaining an un-indented area of said flange at a predetermined distance from the vehicle body, said un-indented area of said flange including exposed inner areas facing toward the vehicle body and exposed outer areas facing away from the vehicle body,
   wherein said predetermined distance permits said exposed inner and outer areas to be coated by a corrosion protection liquid for thereby minimizing corrosion on said un-indented area for the predetermined time period.

14. A weather strip flange according to claim 13, wherein said indented area is generally rectangular.

15. A weather strip flange according to claim 13, wherein said corrosion protection liquid is phosphate and e-coat.

16. A weather strip flange according to claim 13, wherein said flange includes virtually no rust for corrosion testing for 10 years.

17. A weather strip flange according to claim 13, wherein said flange includes virtually no rust on said exposed inner and outer areas for corrosion testing for 10 years.

18. A weather strip flange according to claim 13, wherein said opening is elongated for permitting adjustment of the flange during attachment to the vehicle body.

\* \* \* \* \*